(No Model.) 2 Sheets—Sheet 1.
F. GLEASON.
BICYCLE SUPPORT.
No. 483,146. Patented Sept. 27, 1892.
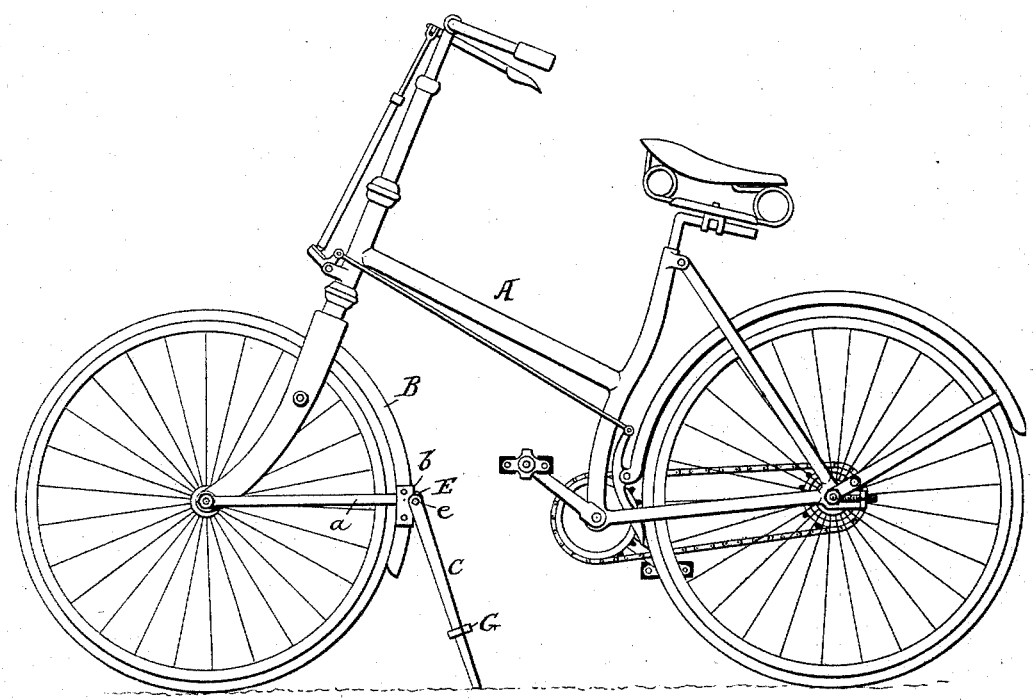
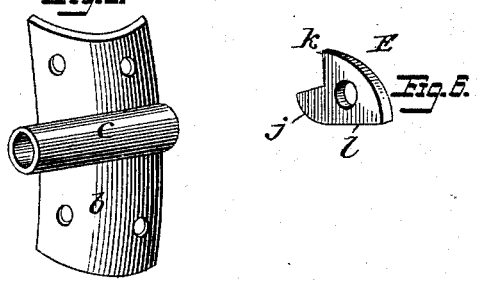
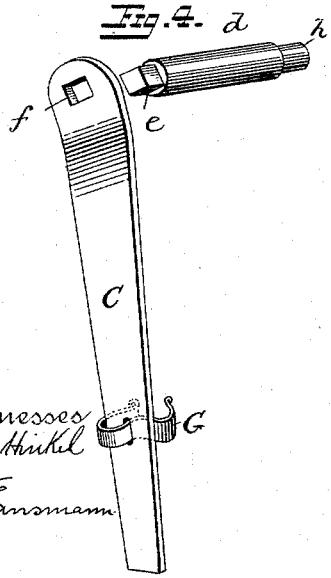
Witnesses
Jno. G. Hinkel
A. E. F. Hansmann
Inventor
Francis Gleason,
by Foster & Freeman
Attorneys (No Model.) 2 Sheets—Sheet 2.

F. GLEASON.
BICYCLE SUPPORT.

No. 483,146. Patented Sept. 27, 1892.

Witnesses
Jno. G. Hinkel
A. E. Fansmann.

Inventor
Francis Gleason,
by Foster & Freeman
Attorneys

UNITED STATES PATENT OFFICE.

FRANCIS GLEASON, OF PHILADELPHIA, PENNSYLVANIA.

BICYCLE-SUPPORT.

SPECIFICATION forming part of Letters Patent No. 483,146, dated September 27, 1892.

Application filed October 29, 1891. Serial No. 410,251. (No model.)

*To all whom it may concern:*

Be it known that I, FRANCIS GLEASON, a citizen of the United States, residing in Philadelphia, in the county of Philadelphia and State of Pennsylvania, have invented certain new and useful Improvements in Bicycle-Supports, of which the following is a specification.

My invention is an improvement in supports for holding Safety bicycles in an upright position and for thus locking them immovably in place when not in use or while being cleaned; and it consists in a support constructed and applied to the mud-guard of a bicycle of this type, as hereinafter more particularly set forth, and illustrated in the accompanying drawings, in which—

Figure 2:
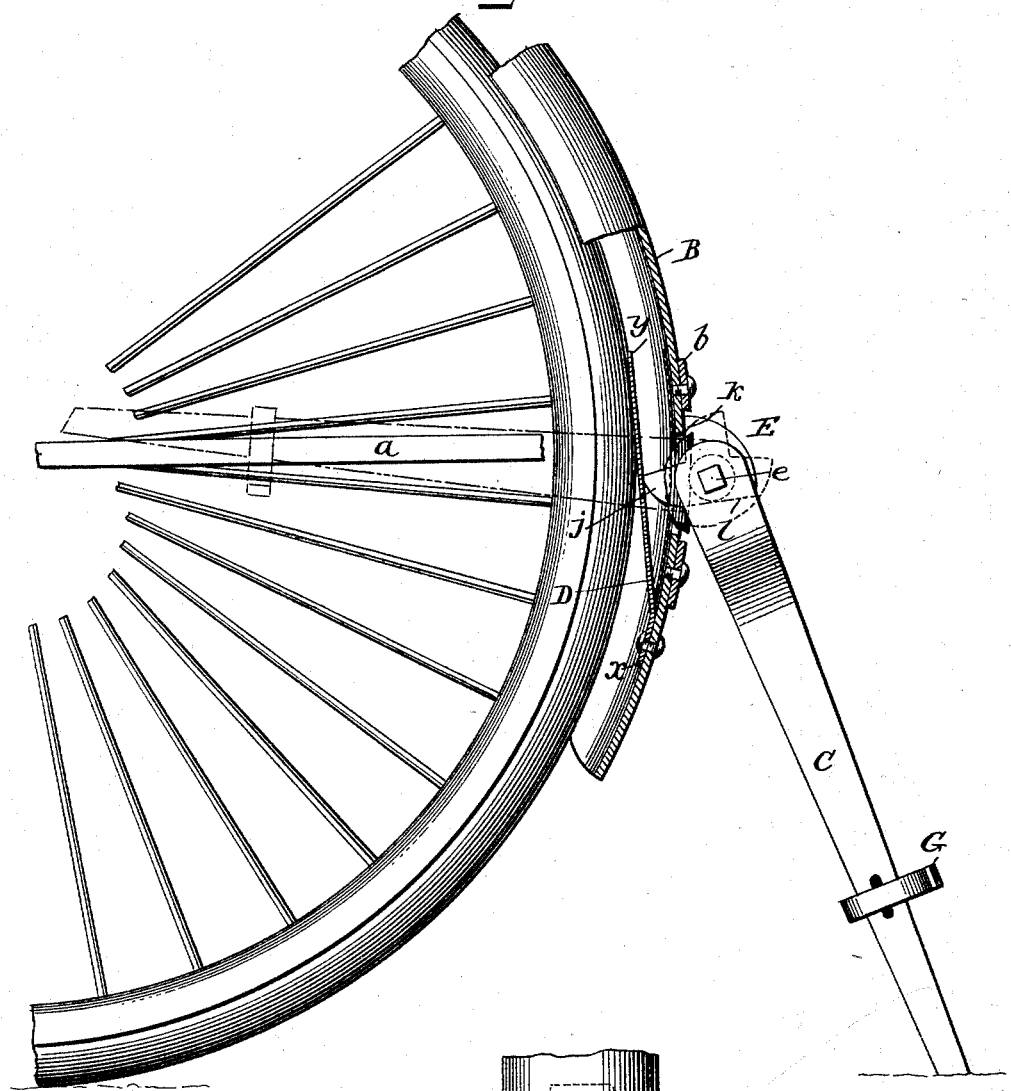
Figure 3:
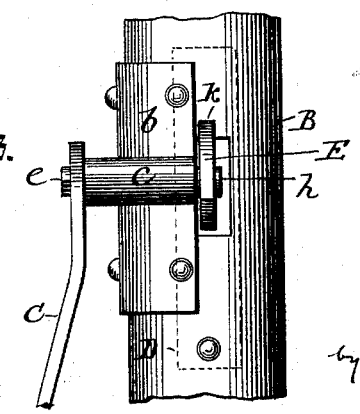

Figure 1 is a side elevation of a Safety bicycle with my improved support applied thereto and shown held in a vertical position thereby. Fig. 2 is an enlarged side view, partly in section, of a portion of the front wheel and mud-guard with the support attached and showing clearly the relative arrangement of the locking-plate. Fig. 3 is a rear view of portion of the mud-guard and its related parts detached, and Figs. 4, 5, and 6 are detail views.

It is to be understood that the improved support may with equal facility and advantage be applied to and used upon any of the ordinary types of Safety bicycles now in common use, and as the invention pertains wholly to the support and its related parts and connections with the mud-guard a description of the particular machine shown will be omitted.

Referring to the drawings, A designates a Safety bicycle of any preferred make, and B is the mud-guard of the front wheel, this guard being of ordinary construction and secured in place at its upper end in any approved manner, while at its lower end the guard is connected to the front fork or axle of the said wheel by diverging brace rods or bars $a\,a$, as usual.

As shown, a bearing piece or plate $b$ is secured to the outer face of the mud-guard B, preferably at one side of the longitudinal center thereof and opposite the ends of the bars $a\,a$, and this plate is provided with a bearing or hub $c$, arranged substantially parallel to the axis of the front wheel. A spindle or pin $d$ is journaled in the hub $c$ to turn freely therein, and upon the outer projecting end $e$ of the pin is mounted an arm C, constituting a side support for the machine when at rest and the arm properly adjusted to engage the ground at its free end, as indicated in full lines, Figs. 1 and 2. The arm C may be permanently or detachably secured to the pin $d$ in any suitable manner. In the present instance the pin is made angular at the end $e$ and is fitted into a correspondingly-shaped opening $f$ in the upper end of the arm, and the latter is preferably bent laterally or set at an acute angle to the axis of the pin, so that when in position to support the bicycle upright the free end of the arm will extend a sufficient distance to one side of the machine to provide a firm support therefor. This arrangement of the arm also permits it to lie close to the machine and substantially parallel with the adjacent brace-bar $a$ when the arm is in its elevated position, as shown in dotted lines, Fig. 2.

To lock the bicycle against movement when at rest and supported in an upright position by the arm C, a brake-plate D, of spring metal, is secured, preferably at its lower end $x$, to the inner face of the mud-guard B, the opposite end $y$ of said plate being free and adapted to be swung toward and into engagement with the tire of the wheel. This brake-plate lies normally in contact with the mud-guard to permit free movement of the wheel, and an opening or slot $i$ is provided in said guard in line with the plate D and adjacent to the pin $d$, upon which the supporting-arm C is secured. A cam-piece E, having a cam-face $j$, a lug or shoulder $k$, and a cut-away portion or flat face $l$, relatively arranged, as clearly shown in Fig. 6, is mounted upon the inner projecting end $h$ of the pin $d$ opposite the slot $i$ in the guard and is keyed or otherwise secured to the pin. The cam-piece E and arm C are so arranged relatively upon the pin $d$ that when the arm is in position to maintain the bicycle upright the cam-face $j$, extending through the slot $i$ in the guard, engages the brake-plate D, forces it into contact with the periphery of the wheel, and locks the latter against movement, while at the same time the shoulder $k$ bears against the upper edge of said slot, and thus limits the rearward movement of the arm, as best seen in full lines, Fig. 2. When the arm is elevated, as indicated in dotted lines in said Fig. 2, the flat face $l$ of the cam-piece is opposite the brake-plate and the latter occupies its retracted or normal position and the wheel is free to rotate, and the pressure of the spring brake-plate upon said flat face tends to retain the arm elevated and prevents rattling of the parts when the machine is in motion.

The supporting-arm may be positively supported in its elevated position in any suitable manner; but, as preferred and shown, the arm is provided near its free end with a spring-metal clasp G, of an approximate U shape, which clasp is adapted to engage and partly encircle the adjacent brace-bar $a$, and thereby retain the arm elevated, while at the same time permitting its ready detachment when required for service.

It will be seen that in the use of my device the inner portion of the mud-guard presents, practically an unbroken surface free from all projections and other obstructions liable to accumulate dirt and thereby gradually choke up the guard. It will also be noticed that as the supporting-arm is arranged wholly at one side of the guard it is not necessary to turn the front wheel out of a straight line with the rear wheel in order to support the machine in an upright position. It follows, therefore, that the machine can be made to stand in a comparatively limited space and that the liability of its being knocked down and other objections incident to the use of supports requiring the front wheel to be deflected to one side before the bicycle can be held upright thereby are overcome.

Although I have shown and described the supporting-arm and locking-plate as being attached to the mud-guard of the front wheel of a bicycle, it will be apparent that they may, if desired, be applied to the rear mud-guard without material change, especially in those Safeties in which the rear mud-guard is long and extends well down in rear of the driving-wheel.

It will further be apparent that instead of bending or arranging the supporting-arm upon the pin which carries it in the manner above described the pin may be extended a suitable distance beyond the side of the machine and the arm may be mounted upon the pin at a right angle thereto, and other slight structural changes may be made without departing from the spirit of the invention, and the device may be located at any suitable height upon the mud-guard instead of opposite the ends of the usual brace-rods thereof; but the latter point of attachment is preferred, as the said rods take up the strain which would otherwise be imposed on the mud-guard when the arm is in its supporting position and the locking-plate is in contact with the wheel.

The improved device is simple, strong, and light and may be readily attached at a comparatively small cost to machines now in use, as well as to those in course of manufacture, and when in place it forms a convenient and effective means for supporting and locking the machine in an upright position either upon the street or elsewhere.

Without limiting myself to the precise construction and arrangement of parts shown and described, I claim—

1. The combination, with a Safety bicycle having a mud-guard, of a laterally-bent supporting-arm pivoted to said guard at one side thereof, substantially as described.

2. The combination, with a Safety bicycle having a mud-guard, of a supporting-arm pivoted to said guard, a brake-plate, and means for forcing said plate against the wheel as the arm is moved to its upright position, substantially as described.

3. The combination, with a Safety bicycle having a front mud-guard, of a supporting-arm pivoted to the guard at one side, a brake-plate secured to the inner side of the guard, and a cam-piece connected with the arm and adapted to force said plate into engagement with the wheel as the arm is moved to an upright position, substantially as described.

4. The combination, with a Safety bicycle having a front mud-guard, of a supporting-arm pivoted thereto, a spring-metal brake-plate secured at one end to the guard, and a cam-piece connected with the arm and adapted to move the free end of the brake-plate against the wheel as the arm is adjusted to an upright position, substantially as described.

5. The combination, with the mud-guard having a slot and the brake-plate carried by the guard, of a bearing on the guard at one side of the slot, a pin journaled in said bearing, a supporting-arm at the outer end of the pin, a cam-piece at the other end of the pin and extending through the slot to engage the brake-plate, and a shoulder on the cam-piece, substantially as described.

6. The combination, with the mud-guard connected at or near its lower end by brace-rods, of a supporting-arm pivoted to the guard at one side thereof and a spring-clasp carried by said supporting-arm and adapted to engage the adjacent brace-rod, substantially as described.

In testimony whereof I have signed my name to this specification in the presence of two subscribing witnesses.

FRANCIS GLEASON.

Witnesses:
SAMUEL P. COURTNEY,
WM. H. PRICE.